United States Patent
Yoshida et al.

(10) Patent No.: US 11,162,412 B2
(45) Date of Patent: Nov. 2, 2021

(54) CASING FOR EXHAUST TURBOCHARGER TURBINE, EXHAUST TURBOCHARGER TURBINE, AND MANUFACTURING METHOD THEREOF

(71) Applicant: MITSUBISHI HEAVY INDUSTRIES ENGINE & TURBOCHARGER, LTD., Sagamihara (JP)

(72) Inventors: Toyotaka Yoshida, Tokyo (JP); Bipin Gupta, Tokyo (JP); Yosuke Dammoto, Tokyo (JP); Yoji Akiyama, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 122 days.

(21) Appl. No.: 16/481,753

(22) PCT Filed: Mar. 24, 2017

(86) PCT No.: PCT/JP2017/012179
§ 371 (c)(1),
(2) Date: Jul. 29, 2019

(87) PCT Pub. No.: WO2018/173298
PCT Pub. Date: Sep. 27, 2018

(65) Prior Publication Data
US 2020/0040809 A1    Feb. 6, 2020

(51) Int. Cl.
*F02B 37/02*    (2006.01)
*F01D 9/02*    (2006.01)

(52) U.S. Cl.
CPC ............. *F02B 37/02* (2013.01); *F01D 9/026* (2013.01); *F05D 2230/00* (2013.01); *F05D 2250/63* (2013.01); *F05D 2300/516* (2013.01)

(58) Field of Classification Search
CPC ................. F02B 37/02; F05D 2230/00; F05D 2300/516; F05D 2250/63; F01D 9/026; F04D 29/4206
See application file for complete search history.

(56) References Cited

U.S. PATENT DOCUMENTS

2006/0188368 A1    8/2006 Jinnai et al.
2016/0177897 A1*   6/2016 Naruoka ............. F04D 29/4206
                                                        415/204

(Continued)

FOREIGN PATENT DOCUMENTS

JP          4275081 B2    6/2009
WO    WO 2012/127531 A1  9/2012

(Continued)

OTHER PUBLICATIONS

The Effect of Volute Surface Roughness on the Performance of Automotive Turbocharger Turbines—Andreas Lintz Presented Jan. 16-18, 2017 (Year: 2017).*

(Continued)

*Primary Examiner* — Ngoc T Nguyen
(74) *Attorney, Agent, or Firm* — Birch, Stewart, Kolasch & Birch, LLP

(57) ABSTRACT

Provided is a casing 21 for an exhaust turbocharger turbine 2, configured so as to house a turbine rotor 23 to be driven by exhaust gas and form a spiral scroll 22 serving as a path for supplying the exhaust gas to the turbine rotor 23, wherein the scroll 22 includes a first region 222a extending from a spiral origin position 222s to a predetermined angle θ and a second region 222b extending from the predetermined angle θ to a spiral end position 222e, with the surface area of an interior wall thereof decreasing from the spiral origin position 222s toward the spiral end position 222e, and the (Continued)

interior wall at the first region 222a has a lower surface roughness than that at the second region 222b.

13 Claims, 5 Drawing Sheets

(56) References Cited

U.S. PATENT DOCUMENTS

| | | |
|---|---|---|
| 2016/0290163 A1 | 10/2016 | Yokoyama et al. |
| 2017/0204743 A1 | 7/2017 | Yokoyama et al. |
| 2018/0250791 A1 | 9/2018 | Rao |

FOREIGN PATENT DOCUMENTS

| | | | |
|---|---|---|---|
| WO | WO 2015/097872 A1 | 7/2015 | |
| WO | WO 2016/071959 A1 | 5/2016 | |
| WO | WO-2016079872 A1 * | 5/2016 | ............. F02B 37/24 |
| WO | WO 2017/033211 A1 | 3/2017 | |

OTHER PUBLICATIONS

Extended European Search Report for European Application No. 17902317.1, dated Nov. 15, 2019.
Office Action dated Apr. 21, 2020 issued in corresponding Japanese Patent Application No. 2019-506923 with a machine translation.

\* cited by examiner

CASING FOR EXHAUST TURBOCHARGER TURBINE, EXHAUST TURBOCHARGER TURBINE, AND MANUFACTURING METHOD THEREOF

TECHNICAL FIELD

The present invention relates to a casing for an exhaust turbocharger turbine, an exhaust turbocharger turbine, and a method for manufacturing a casing for an exhaust turbocharger turbine.

BACKGROUND ART

Techniques relating to exhaust turbocharger turbines are known in the related art. For example, PTL 1 discloses a variable capacity-type exhaust turbocharger that causes exhaust gas from an engine to act on a turbine rotor through a plurality of nozzle vanes provided in a scroll formed in a casing and on the inner peripheral side of the scroll.

CITATION LIST

Patent Literature

[PTL 1] Japanese Patent No. 4275081

SUMMARY OF INVENTION

Technical Problem

In the exhaust turbocharger turbine, pressure loss in intra-scroll exhaust gas flow increases when surface roughness of an inner wall surface of the scroll is high. In addition, in a case where the surface roughness of the inner wall surface of the scroll is high, the exhaust gas flow in the vicinity of the inner wall surface is easily disturbed, and then heat transfer is promoted between the inner wall surface and the exhaust gas flow and energy loss arises before the exhaust gas is introduced into the turbine rotor. The efficiency of the turbine declines as a result. Once treatment for reducing the surface roughness of the inner wall surface is performed over the entire circumference of the scroll, however, an increase in the manufacturing cost of the exhaust turbocharger turbine and a decline in mass productivity ensue.

The present invention has been made in view of the above, and an object of the present invention is to provide an exhaust turbocharger turbine that is inexpensive and excellent in mass productivity and allows turbine efficiency improvement.

Solution to Problem

In order to solve the above problems and achieve the object, the present invention provides a casing for an exhaust turbocharger turbine, accommodating a turbine rotor driven by exhaust gas and forming a spiral scroll as a path through which the exhaust gas is supplied to the turbine rotor, in which the scroll includes a first range from a winding start position to a predetermined angle and a second range from the predetermined angle to a winding end position and a surface area of an inner wall surface of the scroll decreases from the winding start position toward the winding end position and the first range is lower than the second range in surface roughness of the inner wall surface.

According to this configuration, the surface roughness of the inner wall surface of the first range from the winding start position to the predetermined angle, which is the inner wall surface of the scroll that is relatively large in surface area, is reduced as compared with the inner wall surface of the second range. As a result, thermal energy loss and pressure loss in the flow of the exhaust gas can be prevented. In addition, treatment for reducing the surface roughness is not performed on the inner wall surface of the second range of the scroll, which is relatively small in surface area and less prone than the first range to the thermal energy loss and the pressure loss in the flow of the exhaust gas, and thus an increase in manufacturing cost and a decline in mass productivity can be prevented. Therefore, according to the present invention, an exhaust turbocharger turbine that is inexpensive and excellent in mass productivity can be provided, with which turbine efficiency improvement can be achieved.

Preferably, the predetermined angle is 180 degrees or less.

According to this configuration, the surface roughness is reduced only for the inner wall surface of the first range that is within 180 degrees or less from the winding start position at which the effect of thermal energy loss and flow pressure loss prevention is relatively large. Accordingly, turbine efficiency improvement can be better achieved and an increase in manufacturing cost and a decline in mass productivity can be better prevented at the same time.

Preferably, the predetermined angle is 120 degrees or less.

According to this configuration, the surface roughness is reduced only for the inner wall surface of the first range that is within 120 degrees or less from the winding start position at which the effect of thermal energy loss and flow pressure loss prevention is relatively largest. Accordingly, turbine efficiency improvement can be achieved in a more satisfactory manner and an increase in manufacturing cost and a decline in mass productivity can be prevented in a more satisfactory manner at the same time.

Preferably, the surface roughness of the inner wall surface in the first range is half or less of the surface roughness of the inner wall surface in the second range in value.

According to this configuration, flow pressure loss and thermal energy loss can be prevented well in the first range by means of a sufficient reduction in the surface roughness of the inner wall surface in the first range.

In order to solve the above problems and achieve the object, an exhaust turbocharger turbine of the present invention includes the casing for an exhaust turbocharger turbine and the turbine rotor accommodated in the casing and driven by the exhaust gas supplied via the scroll.

According to this configuration, the surface roughness of the inner wall surface of the first range from the winding start position to the predetermined angle, which is the inner wall surface of the scroll that is relatively large in surface area, is reduced as compared with the inner wall surface of the second range. As a result, thermal energy loss and pressure loss in the flow of the exhaust gas can be prevented. In addition, treatment for reducing the surface roughness is not performed on the inner wall surface of the second range of the scroll, which is relatively small in surface area and less prone than the first range to the thermal energy loss and the pressure loss in the flow of the exhaust gas, and thus an increase in manufacturing cost and a decline in mass productivity can be prevented. Therefore, according to the present invention, an exhaust turbocharger turbine that is inexpensive and excellent in mass productivity can be provided, with which turbine efficiency improvement can be achieved.

Preferably, the exhaust turbocharger turbine of the present invention further includes a variable nozzle mechanism controlling a capacity of the exhaust gas supplied to the turbine rotor.

According to this configuration, thermal energy loss can be prevented well in the turbine for a variable capacity-type exhaust turbocharger, in which thermal energy loss is likely to arise in the scroll during low-flow rate operation in particular. In other words, the present invention is suitable for application to the turbine for a variable capacity-type exhaust turbocharger.

In order to solve the above problems and achieve the object, the present invention provides a method for manufacturing a casing for an exhaust turbocharger turbine forming a spiral scroll through which exhaust gas is supplied to a turbine rotor, the method including forming the scroll such that a first range from a winding start position to a predetermined angle and a second range from the predetermined angle to a winding end position are partitioned from each other by the casing being cast with a mold pre-provided with two ranges different in surface roughness, in which the first range is lower than the second range in surface roughness of an inner wall surface.

According to this configuration, the surface roughness of the inner wall surface of the first range from the winding start position to the predetermined angle, which is the inner wall surface of the scroll that is relatively large in surface area, is reduced as compared with the inner wall surface of the second range. As a result, thermal energy loss and pressure loss in the flow of the exhaust gas can be prevented. In addition, treatment for reducing the surface roughness is not performed on the inner wall surface of the second range of the scroll, which is relatively small in surface area and less prone than the first range to the thermal energy loss and the pressure loss in the flow of the exhaust gas, and thus an increase in manufacturing cost and a decline in mass productivity can be prevented. In addition, since it is possible to cast the casing forming the scroll including the second range lower in surface roughness than the first range by means of the mold pre-provided with the two ranges different in surface roughness, a decline in mass productivity can be prevented well. Therefore, according to the present invention, an exhaust turbocharger turbine that is inexpensive and excellent in mass productivity can be provided, with which turbine efficiency improvement can be achieved.

Preferably, surface coating is performed on the inner wall surfaces of the first and second ranges with different materials.

According to this configuration, the surface roughness of the inner wall surface of the first range and the surface roughness of the inner wall surface of the second range can be easily and appropriately adjusted by means of the surface coating using the different materials.

Advantageous Effects of Invention

The casing for an exhaust turbocharger turbine, the exhaust turbocharger turbine, and the method for manufacturing a casing for an exhaust turbocharger turbine according to the present invention have the effects of allowing the exhaust turbocharger turbine that is inexpensive and excellent in mass productivity to be provided and allowing turbine efficiency improvement.

DESCRIPTION OF EMBODIMENTS

Hereinafter, an embodiment of a casing for an exhaust turbocharger turbine, an exhaust turbocharger turbine, and a method for manufacturing a casing for an exhaust turbocharger turbine according to the present invention will be described in detail with reference to accompanying drawings. The present invention is not limited by the embodiment.

Figure 1:
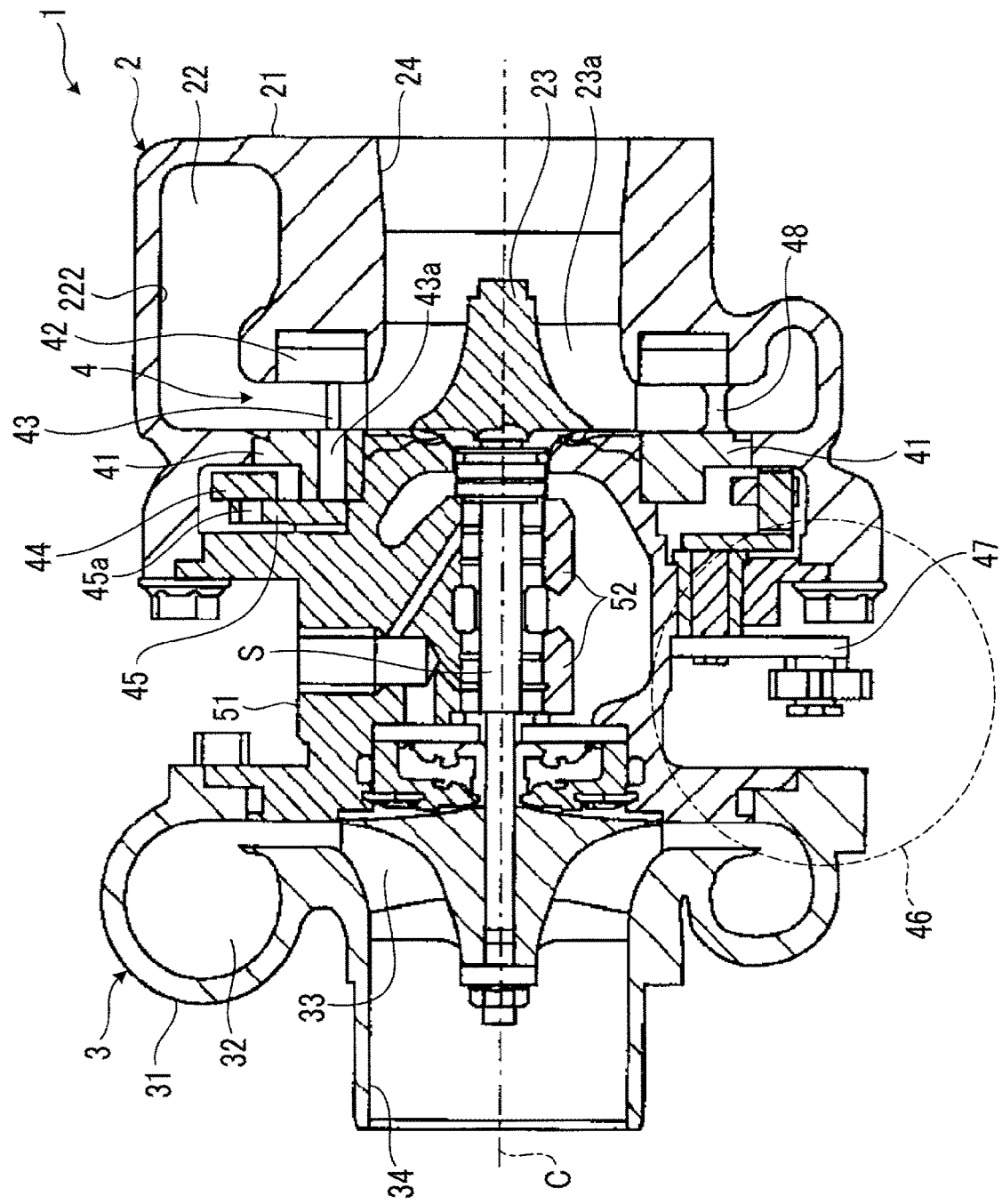
FIG. 1 is a schematic configuration diagram of an exhaust turbocharger provided with a casing and an exhaust turbocharger turbine according to an embodiment of the present invention.

FIG. 1 is a schematic configuration diagram of an exhaust turbocharger provided with the casing and the exhaust turbocharger turbine according to the embodiment of the present invention. An exhaust turbocharger 1 illustrated in FIG. 1 is provided with an exhaust turbocharger turbine 2 (appropriately referred to as "turbine 2" in the following description) driven by exhaust gas guided from an internal combustion engine (not illustrated) of an automobile or the like, a compressor 3 driven as the turbine 2 is driven and pumping outside air to the internal combustion engine, and a variable nozzle mechanism 4 controlling the capacity of the exhaust gas that is introduced into the turbine 2. In the present embodiment, the exhaust turbocharger 1 is a variable capacity-type exhaust turbocharger.

The turbine 2 has a casing 21 according to the embodiment of the present invention. A scroll 22 formed in a spiral shape is formed in the outer peripheral portion of the casing 21. The scroll 22 is connected to the exhaust side of the internal combustion engine. A radial flow-type turbine rotor 23 is disposed in the central portion of the scroll 22. The turbine rotor 23 is fixed to one end of a turbine shaft S and is provided so as to be rotatable around an axial center C of the turbine shaft S together with the turbine shaft S. A plurality of blades 23*a* are attached to the turbine rotor 23. An exhaust gas outlet 24, which opens along a direction along the axial center C, is provided at the center of the casing 21. An exhaust pipe (not illustrated) is connected to the exhaust gas outlet 24.

The compressor 3 has a compressor housing 31. A spiral air passage 32 is formed in the outer peripheral portion of the compressor housing 31. The air passage 32 is connected to the air supply side of the internal combustion engine. An impeller 33 is disposed in the central portion of the air passage 32. The impeller 33 is fixed to one end of the turbine shaft S and is provided so as to be rotatable around the axial center C of the turbine shaft S together with the turbine shaft S. An air inlet 34, which opens along a direction along the axial center C, is provided at the center of the compressor housing 31. An air supply pipe (not illustrated) is connected to the air inlet 34.

The turbine shaft S is rotatably supported by a bearing 52, which is disposed in a bearing housing 51 interposed between the turbine 2 and the compressor 3.

As illustrated in FIG. 1, the variable nozzle mechanism 4 is provided with a nozzle mount 41, a nozzle plate 42, a nozzle vane 43, a drive ring 44, and a lever plate 45.

The nozzle mount 41 is formed in an annular shape. The nozzle mount 41 is fixed to the casing 21 in the casing 21 and on the bearing housing 51 side such that the center of the annular shape coincides with the axial center C.

The nozzle plate 42 is formed in a circular pipe shape. The nozzle plate 42 is fixed to the casing 21 in the casing 21 and on the side that is opposite to the bearing housing 51 such that the center of the circular pipe shape coincides with the axial center C. The nozzle plate 42 is provided so as to face the nozzle mount 41 and is connected to the nozzle mount 41 via a plurality of nozzle supports 48.

The nozzle vane 43 is provided on the turbine 2 side of the nozzle mount 41 and the bearing housing 51 side of the nozzle plate 42 in the scroll 22. The nozzle vane 43 is disposed in the space that is defined between the nozzle mount 41 and the nozzle plate 42. A nozzle shaft 43a is formed integrally with the nozzle vane 43. The nozzle vane 43 is supported so as to be rotatable about the nozzle shaft 43a by the nozzle shaft 43a being inserted through the nozzle mount 41. A plurality of the nozzle vanes 43 are disposed along the circumferential direction of the nozzle mount 41.

The drive ring 44 is formed in an annular shape. The drive ring 44 is supported by the drive ring 44 on the bearing housing 51 side of the nozzle mount 41 such that the center of the annular shape coincides with the axial center C. The drive ring 44 is provided so as to be rotatable around the axial center C with respect to the nozzle mount 41. The drive ring 44 is connected via a link 47 to an operating portion of an actuator 46 fixed to the compressor housing 31 of the compressor 3.

The lever plate 45 is provided on the bearing housing 51 side of the drive ring 44. On one end side of the lever plate 45, a connecting pin 45a fixed to the lever plate 45 is engaged with the drive ring 44. The other end side of the lever plate 45 is connected to the nozzle shaft 43a of the nozzle vane 43. A plurality of the lever plates 45 are disposed along the circumferential direction of the drive ring 44. The number of the lever plates 45 is equal to the number of the nozzle vanes 43.

In the variable capacity-type exhaust turbocharger 1, the exhaust gas from the internal combustion engine is guided to the scroll 22 of the turbine 2, is guided to the space between the nozzle mount 41 and the nozzle plate 42 while circling along the spiral of the scroll 22, and reaches the position of the nozzle vane 43 of the variable nozzle mechanism 4. Further, the exhaust gas rotates the turbine rotor 23 while passing between the respective vanes of the nozzle vanes 43 and is discharged to the outside of the turbocharger from the exhaust gas outlet 24. In the compressor 3, the impeller 33 rotates via the turbine shaft S as the turbine rotor 23 rotates. Then, air is introduced into the compressor housing 31 from the air inlet 34 as the impeller 33 rotates. The introduced air is turbocharged to the air supply side of the internal combustion engine while being compressed in the air passage 32. In the variable nozzle mechanism 4, each lever plate 45 oscillates and the vane angle of each nozzle vane 43 changes once the drive ring 44 is rotated by the actuator 46 being driven. Once the vane angle changes, the gap between the respective vanes of the nozzle vanes 43 narrows or widens. As a result, the capacity of the exhaust gas that reaches the turbine rotor 23 can be controlled.

Figure 4:
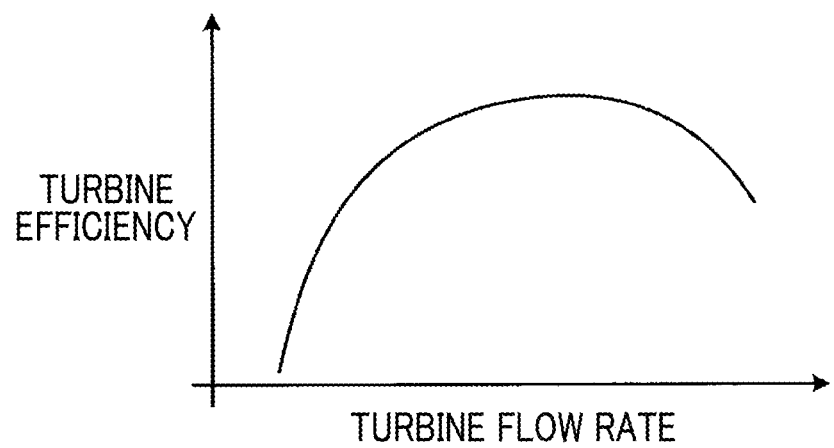
FIG. 4 is an explanatory diagram illustrating a relationship between a flow rate and turbine efficiency of a turbine for a general variable capacity-type exhaust turbocharger.

FIG. 4 is an explanatory diagram illustrating a relationship between a flow rate and turbine efficiency of a turbine for a general variable capacity-type exhaust turbocharger. As illustrated in FIG. 4, in the general exhaust turbocharger, the turbine efficiency tends to decrease as the flow rate decreases. The variable capacity-type exhaust turbocharger is capable of adjusting the flow rate in accordance with the load variation of an internal combustion engine of an automobile or the like and is capable of enhancing the response performance during the low-load operation of the internal combustion engine in particular. In the variable capacity-type exhaust turbocharger, the turbine efficiency during low-flow rate operation significantly contributes to the response performance during the low-load operation of the internal combustion engine. Particularly desired in this regard is turbine efficiency improvement during low-flow rate operation. A configuration for improving the turbine efficiency in the exhaust turbocharger turbine 2 according to the present embodiment will be described below.

Figure 2:
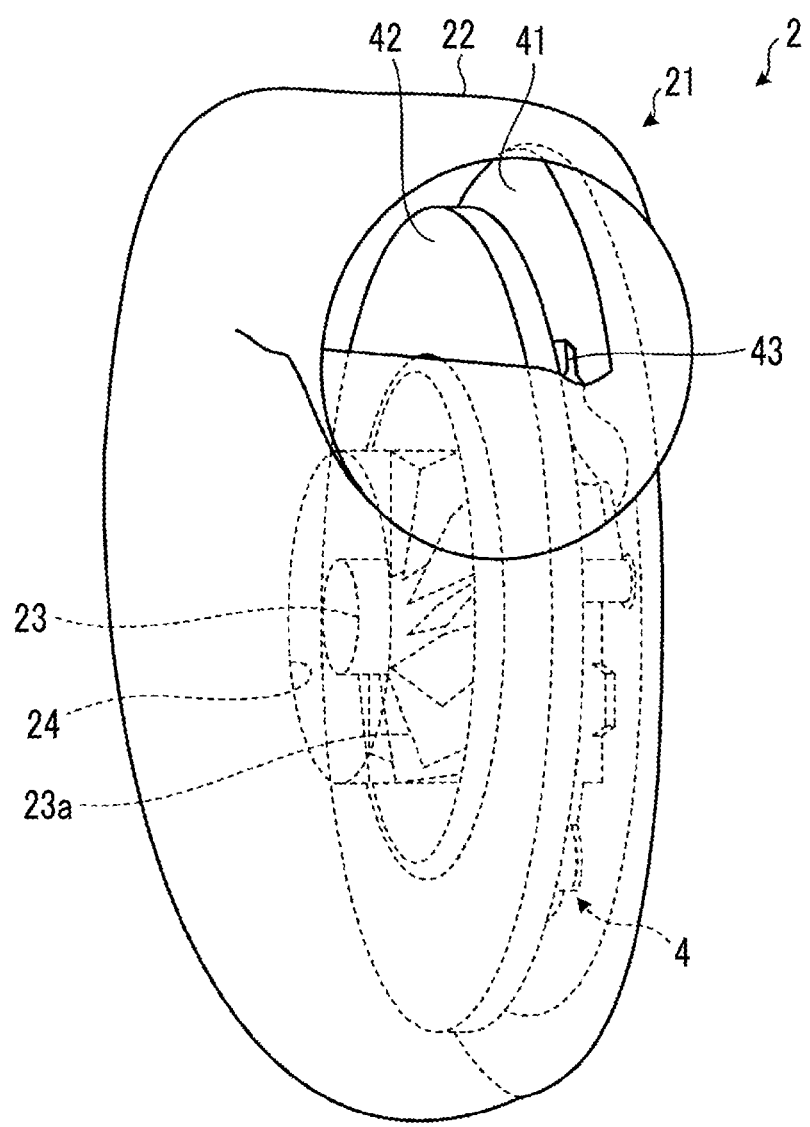
FIG. 2 is a perspective view illustrating the main part of the turbine including a scroll.
Figure 3:
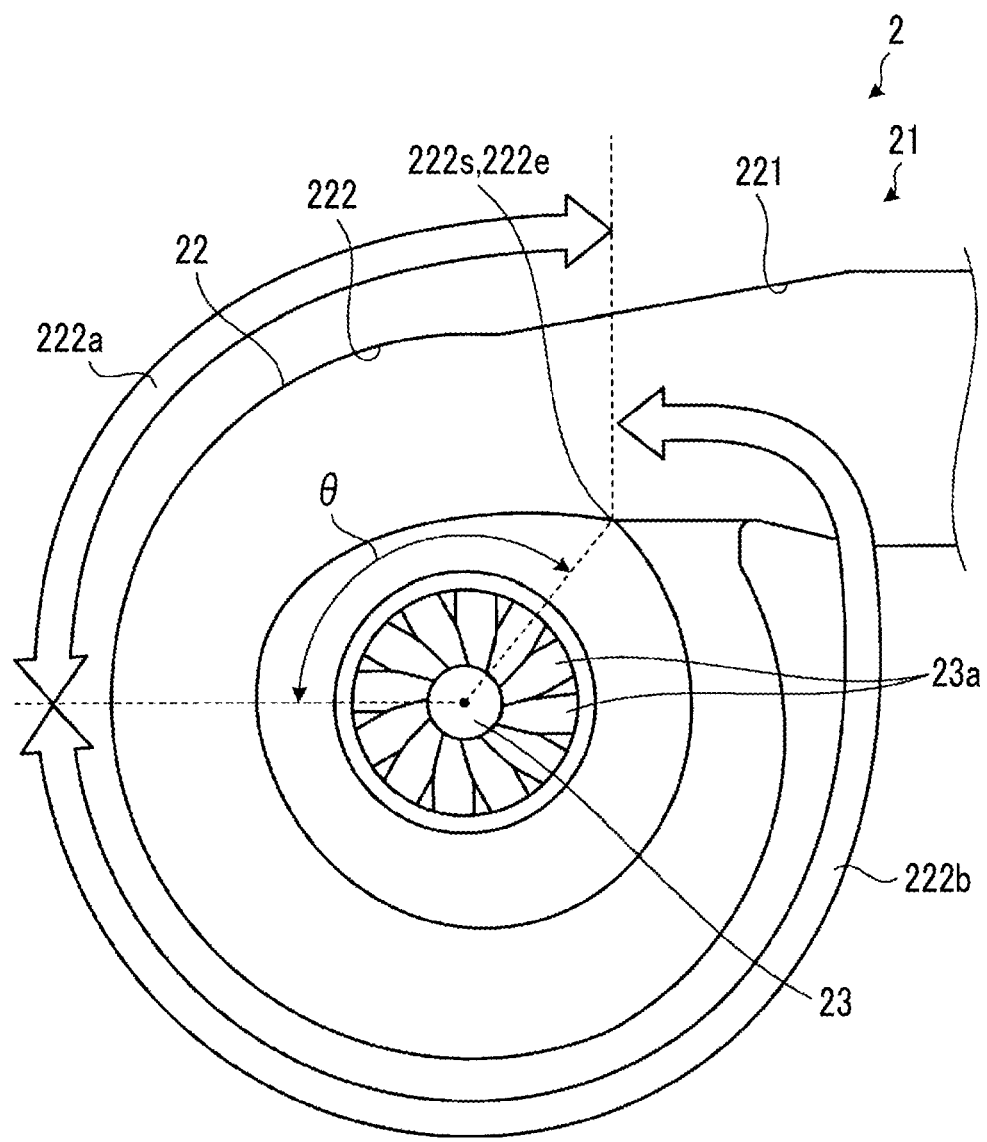
FIG. 3 is a front view illustrating the main part of the turbine including the scroll.

FIG. 2 is a perspective view illustrating the main part of the turbine including the scroll. FIG. 3 is a front view illustrating the main part of the turbine including the scroll. As illustrated in FIGS. 2 and 3, the scroll 22 is formed as a spiral intake path by the casing 21. The scroll 22 has a tubular introduction portion 221 introducing exhaust gas from an internal combustion engine (not illustrated) and an annular portion 222 extending from the introduction portion 221.

The annular portion 222 is formed in a spiral shape about the turbine rotor 23. The annular portion 222 is connected to the outer peripheral portion of the nozzle mount 41 and the nozzle plate 42. The annular portion 222 is partitioned by the nozzle mount 41 and the nozzle plate 42 and communicates with the space where the nozzle vane 43 is disposed. The annular portion 222 is formed so as to tend to gradually decrease in diameter toward the compressor 3 side (left side illustrated in FIG. 1, right side illustrated in FIG. 2, and back side illustrated in FIG. 3) in the axial direction of the turbine rotor 23 (hereinafter, simply referred to as "axial direction") from a winding start position 222s toward a winding end position 222e, which are illustrated in FIGS. 2 and 3. In other words, the annular portion 222 is formed such that the surface area of the inner wall surface of the annular portion 222 tends to decrease from the winding start position 222s toward the winding end position 222e.

The winding start position 222s is the start point position of the annular portion 222. In the present embodiment, the winding start position 222s is the position at which the surface that is positioned on the innermost peripheral side of the scroll 22 starts to have a spiral shape in the flow direction of the exhaust gas (counterclockwise direction in FIG. 3). The winding end position 222e is the end point position of the annular portion 222. In the present embodiment, the winding end position 222e overlaps with the winding start position 222s in front view. In front view, the winding end position 222e may be positioned on the downstream side of the winding start position 222s in the flow direction of the exhaust gas and may be positioned on the upstream side of the winding start position 222s in the flow direction of the exhaust gas. In addition, in front view, the winding start position 222s may be defined as a position overlapping with the downstream side part of the annular portion 222 in the flow direction of the exhaust gas. In this case, the annular portion 222 may include a part extending not in a spiral shape but in a straight line in a predetermined range from the winding start position 222s.

The annular portion 222 of the scroll 22 includes a first range 222a advanced by a predetermined angle θ in the flow direction of the exhaust gas (counterclockwise direction in FIG. 3) from the winding start position 222s and a second range 222b advanced from the predetermined angle θ to the winding end position 222e in the flow direction of the exhaust gas. The first range 222a and the second range 222b are regions obtained by the entire 360-degree circumferential range from the winding start position 222s to the winding end position 222e being divided into two.

The first range 222a of the annular portion 222 is formed so as to be lower in surface roughness Rz than the second range 222b. The surface roughnesses Rz of the first range 222a and the second range 222b are the maximum height roughnesses of the inner wall surfaces of the first range 222a and the second range 222b, respectively. In the present embodiment, a surface roughness Rz1 of the inner wall surface of the first range 222a is half or less of a surface roughness Rz2 of the inner wall surface of the second range 222b. More specifically, the surface roughness Rz1 of the inner wall surface of the first range 222a has a value of, for example, approximately 40 (s). The surface roughness Rz2 of the inner wall surface of the second range 222b has a value of, for example, approximately 120 (s).

A method for manufacturing the casing 21 for the exhaust turbocharger turbine 2 according to the embodiment will be described below.

In the present embodiment, the casing 21 is manufactured by casting. A mold pre-provided with two ranges different in surface roughness is used when the casing 21 is cast. In other words, the surface of the mold is formed in a relatively fine grain shape in the range that corresponds to the first range 222a of the scroll 22 and the surface of the mold is formed in a relatively rough grain shape in the range that corresponds to the second range 222b of the scroll 22. As a result, the different surface roughnesses Rz can be given to the first range 222a and the second range 222b of the scroll 22 during the casting of the casing 21. By casting the casing 21 with the mold pre-provided with the two ranges different in surface roughness as described above, it is possible to better prevent a decline in mass productivity and it is possible to easily form the scroll 22 including the first range 222a lower in surface roughness Rz than the second range 222b.

In the present embodiment, surface coating treatment is performed on the inner wall surfaces of the first range 222a and the second range 222b of the scroll 22 with different materials and after the casing 21 is cast. A coating material capable of relatively reducing the surface roughness Rz1 is used in the first range 222a, and a coating material causing the surface roughness Rz2 to become relatively higher than the surface roughness Rz1 of the first range 222a is used in the second range 222b. As a result, it is possible to easily and appropriately adjust the surface roughness Rz1 of the inner wall surface of the first range 222a and the surface roughness Rz2 of the inner wall surface of the second range 222b.

Figure 5:
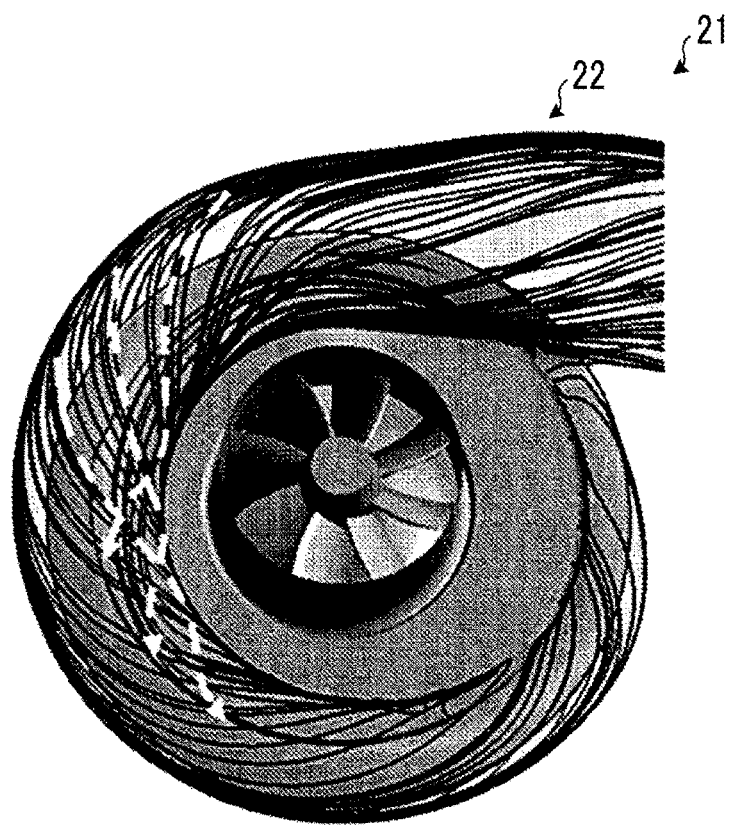
FIG. 5 illustrates an example of the result of analysis of the intra-scroll flow in the exhaust turbocharger turbine according to the embodiment.

Illustrated in FIG. 5 is an example of the result of analysis of the intra-scroll flow in the exhaust turbocharger turbine according to the embodiment. As indicated by the dashed arrows in the drawing, in the scroll 22, the flow circulates, while twisting, from the front half part large in surface area to the rear half part small in surface area. The pressure loss in the flow of the exhaust gas in the scroll 22 increases at this time on condition that the surface roughness Rz of the inner wall surface of the scroll 22 is high. In addition, in a case where the surface roughness Rz of the inner wall surface of the scroll 22 is high, the flow of the exhaust gas in the vicinity of the inner wall surface is easily disturbed, and thus heat transfer is promoted between the inner wall surface and the flow of the exhaust gas. Accordingly, thermal energy loss arises before the exhaust gas is introduced into the turbine rotor 23. The pressure loss in the flow of the exhaust gas and the generation of the thermal energy loss lead to a decline in turbine efficiency. Especially when the turbine 2 is operated at a low flow rate with a small absolute amount of energy, the thermal energy loss has an increasing impact on the decline in turbine efficiency.

As described above, in the casing 21 for the exhaust turbocharger turbine 2 according to the present embodiment, the scroll 22 includes the first range 222a from the winding start position 222s to the predetermined angle θ and the second range 222b from the predetermined angle θ to the winding end position 222e. The surface roughness Rz of the inner wall surface of the first range 222a is formed so as to be lower than the surface roughness Rz of the inner wall surface of the second range 222b. As a result, it is possible to prevent the flow from being disturbed in the vicinity of the inner wall surface of the first range 222a, which is relatively larger in surface area than the second range 222b. In addition, the flow of the exhaust gas can be smoothly guided from the front half part large in surface area to the rear half part small in surface area. As a result, it is possible to prevent pressure loss in the flow of the exhaust gas. Further, the generation of the thermal energy loss in the exhaust gas in the vicinity of the inner wall surface can be prevented since the flow is prevented from being disturbed in the vicinity of the inner wall surface of the first range 222a, which is relatively larger in surface area than the second range 222b. Accordingly, the turbine efficiency can be improved.

Figure 6:
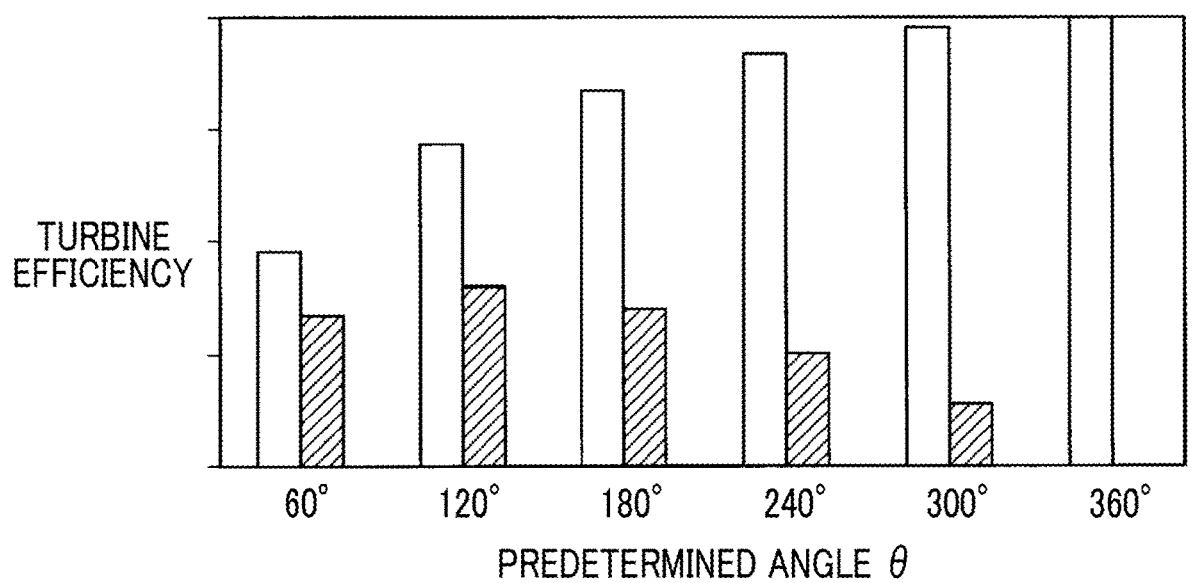
FIG. 6 is an example of the result of analysis of the turbine efficiency improvement margin that results from an increase in a predetermined angle.

Illustrated in FIG. 6 is an example of the result of analysis of the turbine efficiency improvement margin that results from an increase in the predetermined angle. The white bar graphs in FIG. 6 indicate the turbine efficiency improvement margin. The "turbine efficiency improvement margin" is the improvement margin with respect to the turbine efficiency pertaining to a case where the predetermined angle θ is 0 degrees (that is, a case where the first range 222a is not provided). As illustrated in FIG. 6, the turbine efficiency improvement margin increases as the predetermined angle θ increases and the turbine efficiency improvement margin is maximized in a case where the predetermined angle θ is 360 degrees.

The hatched bar graphs in FIG. 6 indicate a turbine efficiency improvement margin that takes the manufacturing cost of the casing 21 into account. The "turbine efficiency improvement margin that takes the manufacturing cost into account" is a value obtained by calculation of an evaluation value and subtraction of the evaluation value from the turbine efficiency improvement margin described above. The evaluation value is calculated based on the amount by which the manufacturing cost of the casing 21 increases with respect to the manufacturing cost of the casing 21 at the predetermined angle θ of 0 degrees as the predetermined angle θ increases. As for the evaluation value, the value that pertains to a case where the predetermined angle θ is 360 degrees (that is, a case where the second range 222b is not provided) is set to the same value as the turbine efficiency improvement margin described above. In other words, the turbine efficiency improvement margin that takes the manufacturing cost into account is set to a value of 0 in a case where the predetermined angle θ is 360 degrees. The evaluation value is proportional to the amount by which the manufacturing cost increases. For example, the value of the evaluation value is calculated as ½ in a case where the amount by which the manufacturing cost increases is ½ of the amount by which the manufacturing cost increases at the predetermined angle θ of 360 degrees.

Basically, the manufacturing cost of the casing 21 increases as the first range 222a widens, that is, as the predetermined angle θ increases. This is because treatment is required for the surface roughness Rz of the inner wall surface of the first range 222a to be reduced as compared with the second range 222b. Accordingly, the turbine efficiency improvement margin that takes the manufacturing cost into account is minimized in a case where the predetermined angle θ is 360 degrees. It can be seen in FIG. 6 that the turbine efficiency improvement margin that takes the manufacturing cost into account is maximized at the predetermined angle θ of 120 degrees. In addition, it can be seen that the value at the predetermined angle θ of 180 degrees and the value at the predetermined angle θ of 60 degrees are substantially equal to each other. When the predetermined angle θ is increased so as to exceed 180 degrees, the turbine efficiency improvement margin that takes the manufacturing cost into account decreases. Accordingly, it is preferable that the predetermined angle θ dividing the first range 222a and the second range 222b from each other is an angle advanced by 180 degrees or less from the winding start position 222s of the annular portion 222. Most preferably, the predetermined angle θ is the angle that is advanced by 120 degrees from the winding start position 222s of the annular portion 222. Then, both turbine efficiency improvement and prevention of an increase in manufacturing cost can be achieved in a satisfactory manner.

As described above, in the casing 21 and the exhaust turbocharger turbine 2 according to the embodiment of the present invention, the surface roughness Rz1 of the inner wall surface of the first range 222a from the winding start position 222s to the predetermined angle θ, which is the inner wall surface of the scroll 22 that is relatively large in surface area, is reduced as compared with the inner wall surface of the second range 222b. As a result, the generation of the thermal energy loss and the pressure loss in the flow of the exhaust gas can be prevented. In addition, treatment for reducing the surface roughness Rz2 is not performed on the inner wall surface of the second range 222b of the scroll 22, which is relatively small in surface area and less prone than the first range 222a to the generation of the thermal energy loss and the pressure loss in the flow of the exhaust gas, and thus an increase in manufacturing cost and a decline in mass productivity can be prevented. Therefore, the casing 21 and the exhaust turbocharger turbine 2 according to the embodiment of the present invention are inexpensive and excellent in mass productivity and turbine efficiency improvement can be achieved with the casing 21 and the exhaust turbocharger turbine 2.

The predetermined angle θ is 180 degrees or less in the present embodiment.

According to this configuration, the surface roughness Rz1 is reduced only for the inner wall surface of the first range 222a that is within 180 degrees or less from the winding start position at which the effect of thermal energy loss and flow pressure loss prevention is relatively large. Accordingly, turbine efficiency improvement can be better achieved and an increase in manufacturing cost and a decline in mass productivity can be better prevented at the same time.

The predetermined angle θ is 120 degrees or less in the present embodiment.

According to this configuration, the surface roughness Rz1 is reduced only for the inner wall surface of the first range 222a that is within 120 degrees or less from the winding start position at which the effect of thermal energy loss and flow pressure loss prevention is relatively largest. Accordingly, turbine efficiency improvement can be achieved in a highly satisfactory manner and an increase in manufacturing cost and a decline in mass productivity can be prevented in a highly satisfactory manner at the same time.

In the present embodiment, the surface roughness Rz1 of the inner wall surface in the first range 222a is half or less of the surface roughness Rz2 of the inner wall surface in the second range 222b in value.

According to this configuration, flow pressure loss and thermal energy loss can be prevented well in the first range 222a by means of a sufficient reduction in the surface roughness Rz1 of the inner wall surface in the first range 222a.

The exhaust turbocharger turbine 2 according to the present embodiment further includes the variable nozzle mechanism 4, which controls the capacity of the exhaust gas that is supplied to the turbine rotor 23.

According to this configuration, thermal energy loss can be prevented well in the turbine 2 for a variable capacity-type exhaust turbocharger, in which thermal energy loss is likely to arise in the scroll 22 during low-flow rate operation in particular. In other words, the present invention is suitable for application to the turbine 2 for a variable capacity-type exhaust turbocharger. The present invention is not limited to the application to the turbine for a variable capacity-type exhaust turbocharger provided with the variable nozzle mechanism 4. The present invention may be applied to a turbine for a fixed capacity-type exhaust turbocharger.

Also in the introduction portion 221 of the scroll 22, the surface roughness Rz of the inner wall surface may be reduced as compared with the surface roughness Rz2 of the inner wall surface of the second range 222b as in the first range 222a of the annular portion 222.

The method for manufacturing the casing 21 is not limited to the method described above. For example, cutting-based surface treatment may be performed on the inner wall surfaces of the first range 222a and the second range 222b of the scroll 22 after casting of the casing 21 such that the surface roughness Rz1 of the inner wall surface of the first range 222a is lower than the surface roughness Rz2 of the inner wall surface of the second range 222b. In addition, the surface roughness Rz1 of the inner wall surface of the first range 222a may be reduced so as to be lower than the surface roughness Rz2 of the inner wall surface of the second range 222b by sheet metals of different materials being fixed to the inner wall surfaces of the first range 222a and the second range 222b of the scroll 22 after casting of the casing 21. In these cases, the casting that is used during the casting of the casing 21 may be a casting that has a constant surface roughness instead of a casting pre-provided with two ranges different in surface roughness. Also in these cases, surface coating treatment may be performed on the inner wall surfaces of the first range 222a and the second range 222b of the scroll 22 with different materials after the casing 21 is cast.

REFERENCE SIGNS LIST

1 Exhaust turbocharger
2 Exhaust turbocharger turbine
21 Casing
22 Scroll
221 Introduction portion
222s Winding start position
222e Winding end position
222 Annular portion 222a First range
222b Second range
23 Turbine rotor
23a Blade
24 Exhaust gas outlet
3 Compressor
31 Compressor housing
32 Air passage
33 Impeller
34 Air inlet
4 Variable nozzle mechanism
41 Nozzle mount
42 Nozzle plate
43 Nozzle vane
43a Nozzle shaft
44 Drive ring
45 Lever plate
45a Connecting pin
46 Actuator
47 Link
48 Nozzle support
51 Bearing housing
52 Bearing
C Axial center
S Turbine shaft
θ Predetermined angle

The invention claimed is:

1. A casing for an exhaust turbocharger turbine, accommodating a turbine rotor driven by exhaust gas and forming a spiral scroll as a path through which the exhaust gas is supplied to the turbine rotor, wherein
the scroll includes a first range from a winding start position to a predetermined angle and a second range from the predetermined angle to a winding end position and a surface area of an inner wall surface of the scroll decreases from the winding start position toward the winding end position, and
the first range is lower than the second range in surface roughness of the inner wall surface.

2. The casing for an exhaust turbocharger turbine according to claim 1, wherein the predetermined angle is 180 degrees or less.

3. The casing for an exhaust turbocharger turbine according to claim 1, wherein the predetermined angle is 120 degrees or less.

4. The casing for an exhaust turbocharger turbine according to claim 1, wherein the surface roughness of the inner wall surface in the first range is half or less of the surface roughness of the inner wall surface in the second range in value.

5. An exhaust turbocharger turbine comprising:
the casing for an exhaust turbocharger turbine according to claim 1; and
the turbine rotor accommodated in the casing and driven by the exhaust gas supplied via the scroll.

6. The exhaust turbocharger turbine according to claim 5, further comprising a variable nozzle mechanism controlling a capacity of the exhaust gas supplied to the turbine rotor.

7. A method for manufacturing a casing for an exhaust turbocharger turbine, accommodating a turbine rotor driven by exhaust gas and forming a spiral scroll as a path through which the exhaust gas is supplied to the turbine rotor, the method comprising:
forming the scroll such that a first range from a winding start position to a predetermined angle and a second range from the predetermined angle to a winding end position are partitioned from each other by the casing being cast with a mold pre-provided with two ranges different in surface roughness,
wherein the first range is lower than the second range in surface roughness of an inner wall surface.

8. The method for manufacturing a casing for an exhaust turbocharger turbine according to claim 7, wherein surface coating is performed on the inner wall surfaces of the first and second ranges with different materials.

9. The casing for an exhaust turbocharger turbine according to claim 2, wherein the surface roughness of the inner wall surface in the first range is half or less of the surface roughness of the inner wall surface in the second range in value.

10. The casing for an exhaust turbocharger turbine according to claim 3, wherein the surface roughness of the inner wall surface in the first range is half or less of the surface roughness of the inner wall surface in the second range in value.

11. An exhaust turbocharger turbine comprising:
the casing for an exhaust turbocharger turbine according to claim 2; and
the turbine rotor accommodated in the casing and driven by the exhaust gas supplied via the scroll.

12. An exhaust turbocharger turbine comprising:
the casing for an exhaust turbocharger turbine according to claim 3; and
the turbine rotor accommodated in the casing and driven by the exhaust gas supplied via the scroll.

13. An exhaust turbocharger turbine comprising:
the casing for an exhaust turbocharger turbine according to claim 4; and
the turbine rotor accommodated in the casing and driven by the exhaust gas supplied via the scroll.

* * * * *